United States Patent
Clough

(10) Patent No.: US 6,824,926 B1
(45) Date of Patent: Nov. 30, 2004

(54) SILICA FILLED POLYMERIC SEPARATOR CONTAINING EFFICIENCY IMPROVING DIATOMITE ADDITIVES

(75) Inventor: Thomas J. Clough, Grover Beach, CA (US)

(73) Assignee: Ensci Inc, Pismo Beach, CA (US)

( * ) Notice: Subject to any disclaimer, the term of this patent is extended or adjusted under 35 U.S.C. 154(b) by 183 days.

(21) Appl. No.: 10/159,906

(22) Filed: Jun. 3, 2002

Related U.S. Application Data

(60) Continuation-in-part of application No. 10/090,951, filed on Mar. 4, 2002, which is a continuation-in-part of application No. 09/774,453, filed on Jan. 30, 2001, now Pat. No. 6,511,775, which is a division of application No. 09/045,725, filed on Mar. 20, 1998, now Pat. No. 6,350,541.

(51) Int. Cl.$^7$ ................................................. H01M 2/16
(52) U.S. Cl. ....................... 429/248; 429/204; 429/145; 429/247
(58) Field of Search ................................. 429/248, 204, 429/145, 247

(56) References Cited

U.S. PATENT DOCUMENTS

| | | | |
|---|---|---|---|
| 4,216,281 A | 8/1980 | O'Rell et al. | |
| 4,383,011 A | 5/1983 | McClelland et al. | |
| 4,529,677 A | 7/1985 | Bodendorf | |
| 4,594,158 A | 6/1986 | Chong et al. | |
| 5,221,587 A | 6/1993 | Bohnstedt et al. | |
| 5,929,204 A | 7/1999 | Noguchi et al. | |
| 5,989,750 A | 11/1999 | Ohba et al. | |
| 6,103,122 A | 8/2000 | Hou et al. | |
| 6,514,641 B2 * | 2/2003 | Clough | 429/248 |

FOREIGN PATENT DOCUMENTS

FR 2440085 of 1980

* cited by examiner

*Primary Examiner*—Laura Weiner
(74) *Attorney, Agent, or Firm*—Frank J. Uxa

(57) ABSTRACT

A battery element of a lead acid battery including a negative plate, a positive plate and a silica filled polyolefin separator having an additive associated with the separator that improves the overall efficiency of the lead acid battery.

17 Claims, No Drawings

SILICA FILLED POLYMERIC SEPARATOR CONTAINING EFFICIENCY IMPROVING DIATOMITE ADDITIVES

RELATED APPLICATIONS

This application is a continuation in part of application Ser. No. 10/090,951, filed Mar. 4, 2002 which application is a continuation in part of application Ser. No. 09/774,453, filed Jan. 30, 2001, now U.S. Pat. No. 6,511,775, which application is a division application of application Ser. No. 09/045,725, filed Mar. 20, 1998, now U.S. Pat. No. 6,350,541. These earlier filed applications are incorporated in their entirety herein by reference.

BACKGROUND OF THE INVENTION

The present invention relates to an improved lead acid battery element containing a metal impurity inhibiting micronized porous powder polymeric additive, which is added to the negative active material and/or battery separator to inhibit the detrimental effects of certain metal cations on the efficiency of a lead acid battery, particularly the negative plate battery element.

Further the present invention relates to a recombinant battery separator element having a micronized porous powder polymeric additive having an average particle size less than 3 microns. In brief the separator battery elements include the addition of the micronized metal impurity inhibiting additive to the separator of a valve regulated recombinant lead acid battery to inhibit the adverse effects of contaminant metal on the negative plate battery element.

Further the present invention relates to a silica filled polymeric separator having a micronized porous powder polymeric additive having an average particle size less than 3 microns associated with the polymeric separator. In brief the separator battery element includes the addition of the micronized polymeric additive to the polymeric separator to inhibit the detrimental effects of certain metal cations on the negative plate of the lead acid battery.

Further the present invention relates to a negative plate battery element having a metal impurity inhibiting micronized porous polymeric additive associated with the negative active material. In brief the negative plate element includes the addition of a micronized polymeric additive having an average particle size less than 3 microns to the negative active material to inhibit the detrimental effects of certain metal cations on the efficiency of the lead acid battery.

Metal impurities can be introduced into a lead acid battery through the use of the many materials used in its manufacture. For example, metal impurities can be introduced with the lead and lead oxides used in the manufacture of the active material, the materials of construction including the lead grids, alloying agents, electrolyte and water. Nearly all metallic impurities, if they are nobler than lead, have a smaller hydrogen overvoltage. Therefore the metals increase hydrogen evolution even if they are deposited in trace concentrations on the surface of the negative plates. These metals cause a continued gas evolution even after charging is completed. Hydrogen is evolved on the deposited metal with low hydrogen overvoltage. Metals can greatly increase the gassing of the negative plate, the order of their influence ranked highest to lowest is as follows: Pt, Au, Te, Ni, Co, Fe, Cu, Sb, Ag, Bi and Sn. The presence of 0.3 ppm of platinum in the acid can cause a doubling of the self-discharge rate. Tin can produce this effect at 0.1-wt %. Freshly deposited antimony is especially active. Besides the discharge of the negative plates with concomitant hydrogen evolution, these materials also move the end of charge voltage of the negative plates toward more positive values. Because the hydrogen overvoltage decreases with temperature, the self-discharge increases through these reactions.

Antimony is often added to grid lead in order to make the lead more fluid and more easily cast into the shapes necessary for storage battery grids. Further, it also hardens the resulting casting so that it can be further processed in the plant without damage. For deep cycle applications, positive grids with 4 to 6 percent antimony are used for forming a permanent low resistance interface with the positive active material.

Antimony in the grid metal produces a definite effect on the charge voltage characteristics of the fully charged battery. The higher the antimony percentage in the grid metal, the lower the charge voltage and conversely, as the antimony is decreased so the charge voltage increases until pure lead is attained, which produces the highest voltage on charge.

Products from corrosion reactions including antimony from the positive grids slowly go into solution in the electrolyte and from there it is believed to electroplate onto the surface of the negative plates. Some metal ions plate out on the negative such as Au, Pt, Hg, Ag, Cu, Sb while others such as Fe, Cd, Zn, Mn, Na, Ca do not. Multivalent metals that do not deposit are shuttle ions which discharge the positive plate, become oxidized, travel to the negative, discharge the negative plate, are reduced, and return to the positive to continue the process. The combination of local action in the electrodes and shuttle ions effects increase self-discharge and causes poor battery shelf life and incomplete recharging. With metal deposition and the lowering of the battery voltage, a constant voltage charger increases the amount of overcharge, increases positive plate polarization and therefore grid corrosion which reduces the life of the battery.

Metal impurities can be particularly detrimental in valve regulated lead acid batteries (VRLA) operating on the oxygen recombination principal. A number of metal impurities can exert a deleterious effect on the performance of VRLA batteries by affecting one or more of the performance requirements of the VRLA batteries such as by increasing oxygen evolution at the positive electrode, increasing hydrogen evolution at the negative electrode, inhibiting full recharge of the negative electrode, increasing negative plate self discharge and increasing the amount of water lost by the battery in this electrolyte limited system. Typical examples of metals that are particularly deleterious in VRLA batteries are arsenic, antimony, cobalt, chromium, nickel, iron, silver, platinum and tellurium. Furthermore, by enhancing oxidative degradation, trace minerals may have an adverse effect on the life of the negative plate expander.

Negative self-discharge has been identified as a chronic problem with VRLA batteries. Further, it has been shown that negative self-discharge does not appear to exist in batteries constructed with ultra-pure battery materials. Evaluations have shown that the spontaneous gassing occurs on the negative plate due to impurities. Gassing rates from negative plates can vary greatly, some negative plates generating twenty times more gas than others due to metal impurities. The use of recycled lead, with its trace impurities, presents a challenge to equal the performance of limited and expensive ultra-pure materials.

The lead acid battery presents an extremely difficult environment in which to control the adverse effects of metal deposition. One of the major environmental design factors, which has to be taken into consideration, is the varying sulfuric acid molarities and battery potentials (voltages) that occur during the charge and discharge reactions in a lead acid battery. For example, the sulfuric acid concentration in deep discharge applications can change from 38-wt % sulfuric acid on charge to 8-wt % sulfuric acid on discharge. Further, the electrochemical potential of both plates will change as the battery is discharged.

From an additive design standpoint the additive must bind metal ions at the varying acid molarities and voltage conditions during the charge/discharge cycles of the battery and such binding of the metal must be substantially irreversible as the acid molarities and electrochemical potentials change. The design for irreversibly binding of a metal ion is particularly difficult as the hydrogen ion concentration increases during the charge sequence of a battery where the hydrogen ion favors release of the metal ion.

The battery environment of changing acid molarity and battery potentials also can affect the ionic form of the metal ion both from the standpoint of valance and even polarity, i.e., cation or anion. In the battery environment the additive has to selectively and permanently bind the particular ionic form in order to minimize its detrimental effect. The battery environment also provides an environment where an intermediate soluble lead ion may be formed during the conversion of solid lead to insoluble lead sulfate. In this environment the additive design requires a stronger binding affinity to the metal impurity ion than to any intermediate soluble lead ion and if any binding does occur the lead ion should be quickly released.

The trace metal ions can in addition have an adverse effect on the negative plate expander present in the negative plate, particularly if the metal ion has catalytic action for the degradation of the organic substances present in the negative plate expander. The additive design requires that the binding of the metal ion deactivate it towards any catalytic properties and that the bound metal ion is not accessible and/or catalytically active for the oxidative degradation of any organic.

SUMMARY OF THE INVENTION

A new battery element which inhibits the detrimental effect of soluble metal impurity cation on the negative plate has been discovered. In brief, the battery elements include the addition of a micronized porous organic polymer powder additive having functional groups with a preferential affinity for the metal impurity in the cation state, to the negative active material or the separator which separates the positive and negative plates within a lead acid battery and which typically is a reservoir for sulfuric acid electrolyte.

A new recombinant battery separator element, which improves the efficiency of the lead acid battery has been discovered. In brief the separator battery element includes the association of a micronized porous organic polymer additive having an average particle size less than 3 microns with the recombinant separator to inhibit the detrimental effects of metal impurity cations. In brief the inhibition of the contaminant metal cations is improved by providing a significant increase in both the surface area and the number of additive particles per unit volume in the separator. The increase in surface area and particle count per unit volume provides for improvement in binding efficiency between the additive and the contaminant metal cation particularly improvement in the rate at which the metal cation is removed from the electrolyte.

A new silica filled polymeric separator element, which improves the efficiency of the lead acid battery has been discovered. In brief the separator battery element includes the association of a micronized porous organic polymer additive having an average particle size less than 3 microns with the silica filled polymeric separator to inhibit the detrimental effects of metal impurity cations. In brief, the inhibition of the contaminant metal cations is improved by providing a significant increase in both the surface area and the number of additive particles per unit volume in the separator. The increase in surface area and particle count per unit volume provides for improvement in binding efficiency between the additive and the contaminant metal cation particularly an improvement in the rate at which the metal cation is removed from the electrolyte.

A new negative plate element, which improves the efficiency of the lead acid battery has been discovered. In brief the negative plate battery element includes the association of a micronized porous organic polymer additive having an average particle size less than 3 microns with the negative plate to inhibit the detrimental effects of metal impurity cations. In brief, the inhibition of the contaminant metal cations is improved by providing a significant increase in both the surface area and the number of additive particles per unit volume in the negative plate. The increase in surface area and particle count per unit volume provides for improvement in binding efficiency between the additive and the contaminant metal cation particularly improvement in the rate at which the metal cation is removed from the electrolyte.

DETAILED DESCRIPTION OF THE INVENTION

In one broad aspect, the present battery elements comprise the addition of a micronized porous organic polymer powder additive containing functional groups with a preferential affinity for metal impurity in the cation state to the negative active material and/or the separator which separates the positive plates from the negative plates in a lead acid battery. In a preferred embodiment, the organic polymers have a plurality of micropores, i.e. the porosity of the polymer allows the soluble metal impurity in the electrolyte to contact both the outer surface of the polymer and the internal surface area created by the microporosity of the organic polymer. The functional groups having a preferential affinity for metal impurity cation include both functional groups on the outer surface and internal surfaces in contact with soluble metal impurity in the electrolyte. The metal impurity inhibiting additives are typically incorporated into the negative active material, and/or the separator in an amount sufficient to inhibit the detrimental effects of metal impurity on the negative plate.

In another broad aspect, the present battery elements comprise the addition of both the micronized metal inhibiting additive and a macroporous additive to the active material present in the negative plates and/or separator in a lead acid battery. In a further preferred embodiment, the macroporous additives have a reduced affinity for bonding with the active material in the negative plate and hydrophobic materials used in the separator.

In another broad aspect, the present battery elements comprise the addition of macroporous additive particles to the separator and/or negative plate to improve the overall metal contaminant electrolyte distribution to the metal inhibiting additive. In brief the battery elements include the addition of macroporous containing particles having an average particle size distribution greater than that of the metal inhibiting additive and having a pore size distribution which will allow a plurality of metal inhibiting additive particles to be associated with at least a part of the internal pore structure of the macroporous additive.

In a further preferred embodiment the metal inhibiting additive can be associated with one or more of the fiber in a recombinant separator and/or the silica in the polymeric separator and/or the macroporous particle additive through a polymeric cationic water soluble linking agent to improve the overall enhanced association of the metal inhibiting additive during battery element manufacture and/or use.

As set forth above, metal impurities can be introduced into the battery during the battery manufacturing process, particularly in the starting materials used for battery manufacture. Many of the metal impurities can exist in the anion or cation form i.e. a negative or positive charge respectively in sulfate solutions such as that represented by sulfuric acid electrolyte. Depending on the molarity of the sulfuric acid electrolyte and the metal impurity, such cation/anion forms can change as the molarity changes. Depending on such sulfuric acid molarity, it is believed that platinum, gold, thallium, nickel, cobalt, iron, copper, antimony, silver, bismuth and tin can exist as anions even though such existence as anions may be weak or unstable. Further, such anion forms may predominant at the sulfuric acid electrolyte concentrations, which exist after battery charging. One of the particularly detrimental metal impurities is platinum.

As set forth above, metal impurity cations can be introduced into the lead acid battery during manufacture. In many battery designs, grid materials not having antimony as an alloying agent are used for battery manufacture. However, even in these types of batteries using nonantimony containing grids, antimony can be introduced as an impurity in the starting materials for battery manufacture including the starting lead and leady oxide type materials.

As set forth above, antimony, which is present in the positive grid as an alloying agent, can be oxidized and/or corroded to form a soluble antimony ion, which diffuses and/or migrates to the negative plate. Antimony at the negative plate can produce a number of detrimental problems such as self discharge and gassing particularly hydrogen formation. Antimony ion from the positive grid can exist in both the anion and cation form, i.e. a negative or positive charge respectively. It is believed that the form of the anion or cation is dependent on the oxidation state of the antimony, i.e. +3 or +5, the molarity of the sulfuric acid and the battery voltage. For example, it is believed that antimony can exist as $SbO2+$ cation and $SbO3-$ anion in the antimony +5 state and as $SbOSO4-$, $Sb(SO4)^{2-}$ $SbO2$ in the antimony +3 state. These +3 anion forms are believed to exist when the molarity of the sulfuric acid is greater than one but may not exist at the fully recharged battery voltage. In addition, it is believed that antimony may exist as $Sb+3$ or $SbO+$ in the antimony +3 state again depending on molarity and battery voltage. As set forth above, the sulfuric acid electrolyte participates in the discharge reactions taking place in the lead acid battery. Thus, the wt % sulfuric acid can decrease from 30–40 wt % sulfuric acid to from 10–14 wt % sulfuric acid depending on the type of battery design and the initial sulfuric acid concentration in the electrolyte. The amount of sulfuric acid remaining will be dependent on the percent of discharge of the battery with less sulfuric acid remaining when batteries are discharged to 80% or more.

The organic polymers having functional groups with a preferential affinity for metal impurities in the cation state inhibit the detrimental effects of soluble metal impurity on the negative plate. While the exact mechanism of inhibition is not known, it is believed that the metal impurity cation is bound by the functional group such as by a cation replacing the cation when the organic polymer contains cation functional groups. Although cation replacement is believed to be one mechanism for inhibiting the adverse effects of metal impurity ions, metal cation impurities can also form complexes and/or be solvated to inhibit the detrimental effect of metal impurities on the negative plate and such mechanisms are included in the term inhibiting. One of the major discoveries of the battery elements of this invention is the inhibition of metal impurities over the varying sulfuric acid molarities and battery potentials (voltages) that occur during the charge discharge reactions in a lead acid battery. Further it has been discovered that the metal impurity which has been inhibited by the micronized organic polymer additive is not substantially and detrimentally desorbed and/or released from the polymer under the sulfuric acid molarity and battery voltage conditions and changes in a lead acid battery, that is the metal impurity inhibition continues during a plurality of charge/discharge reactions within the battery.

As set forth above, the organic polymers containing functional groups can introduce cations into the battery element which cations can be displaced by the metal impurity anion and/or cation. Further, the affinity of the organic polymer having such metal impurity inhibiting functional groups have a stronger binding and/or complex formation and/or solvation of metal impurity ions when compared to any intermediate soluble lead ions such as lead +2 which may be formed during the conversion of solid lead, solid lead peroxide to insoluble lead sulfate. As is known by those having skill within the lead acid battery art, cations which are displaced by metal impurity cations should not introduce any substantial detrimental effects on battery performance.

As set forth above, the organic polymers have functionality which have affinity for metal impurity in the cation form. The metal impurity cation can displace the cation associated with the functional group. Typically, the cation displaced can be hydrogen ion or, for example, sodium ion. The organic polymers having such cation functionality can be further classified as strong acidic cation polymers such as sulfonic or moderate to weak acidic cation polymers. Particularly preferred acidic cation polymers are those containing phosphonic groups. Typical examples of polymers containing such functional groups, for example the sulfonic acid and/or sulfonate functionality are those derived from polystyrene cross linked divinylbenzene, phenol-formaldehyde polymers and other like aromatic containing polymers. As set forth above the organic polymer can have different functional groups such as functional groups containing acidic functionality such as sulphonic and phosphonic functionality on the same organic polymer.

As set forth above, acidic cation polymers are preferred for inhibiting the effects of metal impurities. A particularly preferred functionality on the polymer is phosphonic acid and/or phosphonate here in after referred to as phosphonic functionality. Typical examples of such functionality are:

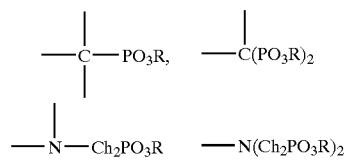

where R is typically hydrogen or sodium ion, preferably hydrogen.

In general the phosphonic functionality can be incorporated into the polymer matrix by chemical reaction including grafting of such functionality, on for example the aromatic portion of polystyrene and/or phenol-formaldehyde polymers. In addition, the functionality can be incorporated by the copolymerization of unsaturated vinylmono gem phosphonic acid or ester monomers with other monomers particularly styrene, with still other monomers such as acrylate or acrylonitrile together with a cross linking agent such as divinylbenzene. A typical monomer used for such copolymerization is vinylidene diphosphonic acid or the ester thereof to produce gem phosphonic functionality. Further examples of such polymers are polymers having a plurality of amino alkylene, phosphonic acid or phosphonate associated with the organic polymer.

As set forth above bis-derivatives are also useful including imino-bis(methylenephosphonic acid). The particularly preferred functionality is amino methylenephosphonic acid groups on polystyrene cross-linked with divinylbenzene.

As set forth above, phosphonic functionality can be incorporated into the polymer by reaction with an existing polymer matrix or by copolymerization of for example a vinyl phosphonic monomer. A preferred polymer is one containing polymerized styrene monomer either as a homopolymer or an interpolymer with other polymerized monomeric units. Such polymers containing polymerized styrene are generally referred to as polystyrene polymers.

As set forth above the organic polymer can have different functional groups such as functional groups containing acidic functionality such as sulphonic and phosphonic functionality on the same organic polymer.

The weakly acidic cation polymers in general have carboxylic functionality and/or the sodium salt associated with the organic polymer. Typical examples of such polymers are those derived from unsaturated carboxylic acids such as acrylic, methacrylic or maleic crosslinked with another monomer such as divinylbenzene or ethylene dimethacrylate.

As set forth above, the organic polymer can have functionality having a preferential affinity for soluble metal impurity anions, i.e. the anion associated with the functionality is displaced by the soluble metal impurity anion in the electrolyte. The organic polymers having anion functionality can have both strongly basic and weakly basic anion functionality. Typical examples of strongly basic anion containing functionality are those having an ammonium functionality associated with the organic polymer. As set forth above, the anion associated with the functionality, typically sulfate or chloride, is displaced by the metal anion within the electrolyte. Typical ammonium groups associated with the polymer include trimethyl ammonium ion and dimethylethanol ammonium ion. Other groups include isothiouronium and derivatives thereof. Typical examples of organic polymers are polystyrene cross-linked with divinylbenzene. The ammonium ion with an appropriate anion can be attached directly to, for example, the aromatic ring of the polystyrene or through, for example, a methylene bridge. Typical examples of weakly basic polymers having anion functionality are polymers, which contain tertiary aliphatic or aromatic aliphatic amine functionalities on the polymer such as polystyrene or a polyunsaturated carboxylic acids. Such polymers are typically cross-linked with a cross-linking agent such as the cross-linking agents referred to above. Further, the polymer basic anion functionality can be obtained through aliphatic polyamine condensation reactions to produce the organic polymer. Typically, the weak base anion resins contain primary, secondary and/or tertiary amine groups generally as a mixture. Typical examples of such amine groups are trimethyl amine and dimethylethanolamine. The preferred organic polymers having anion type functionality are the strongly basic anion containing functionality particularly for their strong binding and low release or desorption of metal impurity properties preferably having ammonium functionality, particularly for incorporation into the negative plates. Since the electrolyte in the lead acid battery is sulfuric acid, it is preferred to use sulfate as the anion to be displaced by metal anion.

As set forth above the organic polymers can contain primary secondary or tertiary amine groups including aliphtaic polyamine functionality. Further as set forth above, such organic polymers can contain aliphatic amine functionality. Further, such polymers can contain amine functionality with acid functionality. Particularly preferred functionalities associated with the organic polymer which contain both amine and acidic functionality are those containing secondary and tertiary amine functionality and acid functionality, such as for example, the examples set forth above.

A particularly preferred class of aliphatic aromatic amine functionality are those having amino pyridine groups associated with the organic polymer. Examples of such groups can be represented by the formula.

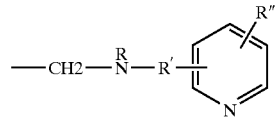

where in R is preferably an aliphatic substituent, an aliphatic polyamino substituent or a 2-picolene containing substituent R' is preferably alkylene, preferably methyleneand R" is a non-substantially interfering substituent, preferably hydrogen. Particularly preferred additives are organic polymers having functionality from 2-picolylamine, N-methly-2-picolylamine, N-2hydroxyethyl)-2-picolylamine, N-(2-methylaminoethyl)-2-picolylamine and bis-(2-picolyl)amine.

The aromatic aliphatic amine functionalities particularly the 2-picolylamine, such as bis-(2-picoly)amine, are particularly useful in inhibiting the detrimental effects of copper and nickel.

The micronized organic polymer additive having functional groups with affinity for metal impurity cation have an average particle size distribution of less than 10 microns, preferably less than 3 microns, preferably less than about 1 micron, and still more preferably less than about 0.5 microns. It has been found that the rate of inhibition of adverse metal cation effects can be improved by providing for an increase in both surface area in $m^2/gram$ as well as particle count per unit volume of the element, i.e. separator or negative plate. The porosity of the preferred micronized organic polymer additive is that which allows the metal impurity, cation to permeate the organic polymer particle thereby affording good contact with the functional groups attached to the external and internal surfaces of the particles. Typically the average pore size distribution is from about 100 angstroms to about 1,000 angstroms typically in the range of from about 250 angstroms to about 750 angstroms. The total displacement capacity of the organic polymer having such functional groups is typically greater than one milliequivalent of displaceable cation per gram of polymer, preferably greater than three and still more preferably greater than five.

In addition to the above average particle size distribution definition, the additive can be defined by the number of particles having a particle size less than a given micron size.

For purposes of this definition, it is preferred that at least 50% of the total number of particles in a given weight of additive have a particle size less than about 4 microns, more preferably less than about 2 microns, more preferably less than about 1 micron and still more preferable less than about 0.5 microns. Further it is preferred that at least 90% of the total number of particles have a particle size less than about 4 microns, more preferably less than about 2 microns, preferably less than about 1 micron.

As set forth above, the micronized metal inhibiting additives can be associated with a macroporous additive to enhance the diffusion of the metal contaminant containing electrolyte to the micronized metal inhibiting additives. It is preferred that the pore size distribution in the macroporous additive is of a size that allows for a plurality of the micronized metal inhibiting additive to be associated with the internal or interior part of the macroporous additive. It has been found that the combination of the micronized and macroporous additive provide for enhanced distribution of electrolyte to the metal inhibiting additive. Typical pore size distribution and particle size distributions for the macroporous additive are set forth below.

A particularly preferred embodiment of this invention is the enhanced association of the micronized metal inhibiting additive particularly at average particle sizes less than 1 micron with one or more of the macroporous additives, recombinant separator fiber mats and the silica filler associated with the polymeric separator. Thus as the average particle size of the micronized additive is decreased the effective association of the micronized additive can be improved particularly from a battery element manufacturing and use standpoint, through the use of a water soluble cationic polymeric linking agent. In a preferred embodiment the charge on the macroporous additive, fiber in the recombinant separator and silica in the silica filled separator is negative and/or anionic in character. In addition the micronized metal inhibiting additive is selected also to have negative and/or anionic character. The cationic nature of the water soluble polymer together with a plurality of cationic charges on the polymer allow for the interaction between the cationic polymer and the other anionic components as set forth above. The use of the cationic polymer allows for a strong association of the various components set forth above with each other through the linking cationic polymer. As the particle size of the micronized metal inhibiting additive is decreased the bonding between the negative or anionic charge on the additive and the cationic polymer becomes stronger. Further the glass fiber used in recombinant battery separators and the silica used in silica filled polymeric separators can have a negative charge on the surface, which charge can be enhanced through aqueous acidic processing. Further a water soluble anionic polymer such as a carboxylated polyacrylamide can be used to surface treat the macroporous additive, recombinant fiber and/or silica to enhance the negative or anionic charge on the surface prior to contacting with the cationic water soluble polymer linking aid. In a preferred embodiment the macroporous additive and/or glass fiber and/or silica is contacted first with an aqueous solution of the cationic polymer typically at concentrations less than 2-wt % basis dry component, for a period of time for the polymer to be associated with the above components. Typical processing and contact times are less than 30 minutes, more typically less than five minutes. The metal inhibiting additive is preferably then introduced after such initial contacting which allows a uniform distribution of the micronized metal inhibiting additive on the cationic polymer treated surfaces.

Typical examples of cationic water-soluble polymers are cationic polyacrylamides and polyethlylenimine and their modifications, polyamine, polydiallyldimethylammonium chloride, cationic starch, polyamides-epichlorohydran crosslinking polymers and mixtures thereof. Examples of modified polyethylenimine are polyethylenimines or ethylenimine modified polyamidoamines whose molecular weights have been increased by cross-linking. These cross-linking reactions are not allowed to proceed to gelation. Applicable cross linkers are epichlorohydrin, polyvinyl alcohol and epichlorohydradrin and polyalkylene oxide epichlorohydrin reaction products. Further examples of cationic polymers are polydicyandiamide formaldehyde polymers and polymers of acrylic monomers comprising a cationic acrylic monomer. Particularly preferred cationic polymers are polyacrylamide and polyethlylenimine cation polymers sold under the trade name Polymin by BASF and the polyamides-epichlorohydran crosslinking polymers sold by Hercules under the trade name Polycup and Kymene.

As set forth above the cationic polymer is generally added to a slurry of the macroporous additive, fiber and/or silica in a concentration typically less than 2 wt % preferably in the range of from 0.01 to 1 based on the dry weight of the component in the slurry. Further it is preferred that the micronized metal inhibiting additive be added subsequent to the slurry after initial association of the above component. Typically the molecular weights of the cationic polymers are greater than 1000, more preferably greater than 100,000. It is preferred that the cationic polymer have a moderate to high charge density and allow for uniform association of the micronized metal inhibiting additive on other negative charged surfaces, such as fiber, silica or macroporous additive. Typical charge densities range from about 5 meq/gram up to about 25 or even higher. Typical molecular weights range from about 100,000 to about 10,000,000, more preferably from about 500,000 to about 5,000,000.

The cationic polymer preferably associates with the anionic surface functional groups of the micronized metal inhibiting additive while reducing and/or minimizing the association of the cationic polymer functional groups with the functional groups on the internal surfaces of the metal inhibiting additive. In a preferred embodiment the molecular weight and the geometric structure of the cationic polymer linking aid is of a size that reduces or minimizes the transport of the water soluble cationic polymer into the internal pores of the micronized metal inhibiting additive. As set forth above preferred molecular weights of from about 500,000 to about 5,000,000 reduce or minimize the diffusion of the polymer into the internal pores of the additive. Further the concentration of the cationic polymer linking agent is adjusted to provide for linking of the various anionic surfaces. In addition the concentration adjusted to link external surfaces which provides for the formation of a uniform coating of the micronized metal inhibiting additive on one or more of the surfaces of macroporous additive, fiber and/or silica. The concentration is adjusted for external surface linkages and in general provides for both a uniform dispersion and a very soft uniform flock if any of micronized metal inhibiting additive readily dispersed and associated with the other anionic surfaces as set forth above.

The concentration of the micronized metal inhibiting additive used in the elements of this invention is typically defined by the amount of metal contaminant introduced initially into the battery and that which can be generated through corrosion mechanisms for liberation of metal cations into the electrolyte. Thus for example, antimony containing grids such as 6 wt % antimony can have a corrosion rate which produce 30 or even 50% corrosion of the positive grids. In order to control the amount of antimony introduced into the electrolyte, additive concentrations in the negative active material and separator are typically in the range of from about 1.5 to about 7.5 wt % basis the total weight of the negative active material and/or the weight of the separator. Where corrosion is not the primary mechanism for introducing metal contaminants than the amount of additive would be less typically in the range of from about 0.25 to 1.25 wt % basis the negative active material or the weight of the separator. As set forth above one of the advances of the present invention is the ability to improve the rate of binding of the metal contaminant cation through rapid diffusion into the pores of the micronized metal inhibiting additive. The ratio of the micronized metal inhibiting additive to the macroporous additive can vary over a wide range with typical ratios on a weight basis of micronized additive to macroporous additive being from about 1:30 to about 1:10.

As set forth above the macroporous additive can be contacted with an aqueous solution of the cationic polymer. The micronized metal inhibiting additive can then be added to the treated macroporous additive to form the association between the two additives linked by the cationic polymer. The combination of the two additives can be used as an additive combination and blended with leady oxide, water and sulfuric acid to form negative active material using conventional plate making processes. Further the additive combination can be combined with fiber mat production for recombinant separators for introducing the additive combination into the recombinant separator. Further the additive combination can be combined with typical silicas used for the manufacture of silica filled polymeric separators and combined with polymers for production through conventional extrusion processes for the manufacture of silica filled polymeric separators.

Any suitable positive active electrode material or combination of such materials useful in lead-acid batteries may be employed in the present invention. The positive active electrode material can be prepared by conventional processes. For example, a positive active electrode material precursor paste of lead sulfate and litharge (PbO) in water can be used, or conventional pastes, such as those produced from leady oxide, sulfuric acid and water, can be used. After the paste is applied to the grid material, it is dried and cured. The precursor paste may be converted to lead dioxide by applying a charging potential to the paste.

Any suitable negative active electrode material useful in lead-acid batteries may be employed in the present invention. One particularly useful formed negative active electrode material comprises lead, e.g., sponge lead. Conventional lead paste prepared from leady oxide, sulfuric acid, water and suitable expanders can be used.

As set forth above, the additives are typically incorporated into the negative active material at a concentration of up to about 5-wt %. The macroporous particle additives and the metal inhibiting additives are incorporated during battery manufacture preferably during the production of the paste prior to application on the grid material. The additives can be incorporated into, for example, the lead, leady oxide powders to which the sulfuric acid and water are added. Alternatively, the additives can be mixed into the precursor paste prior to applying on the grid material. It is preferred that the additives be incorporated such as to provide a uniform distribution of the additive particles throughout the entire paste, active material.

Each of the cells of a lead acid battery further includes a non-electrically conductive separator acting to separate the positive and negative electrodes of the cell and to hold electrolyte. Any suitable material may be used as a separator provided that it has no substantial detrimental effect on the functioning of the cells or battery. Typical examples of separator material for batteries include glass fiber, sintered polyvinyl chloride and microporous polyethylene, which have very small pore sizes. Certain of these separators are formed as envelopes, with the pasted plates inside and the separator edges sealed permanently. Typically only the positive plates are encased in the separator.

As set forth above, the metal impurity inhibiting additives can be incorporated directly into the negative active material for reducing the detrimental effects of the soluble metal impurity on the negative plates. Further it is believed that the micronized metal inhibiting additive, particularly the metal inhibiting additive having an average particle size less than one micron, acts not only to inhibit the adverse effects of contaminant metal cation but also in the case of the phosphonic metal inhibiting additive set forth above, reduce the adverse effects of sulfation in the negative plate particularly the formation of large lead sulfate crystals which cannot be converted back to sponge lead. The formation of sulfation particularly irreversible sulfation, has been found in the negative plate in partially discharged VRLA batteries. It is believed that the fine micronized powder having the phosphonic functional groups particularly amino phosphonic functional groups interacts with the faces of the lead sulfate crystal to inhibit the growth of the crystal during adverse conditions of the lead acid battery such as partial states of charge and deep discharge for periods of time.

Further, the metal impurity inhibiting additives, as set forth above, can be associated with the separator such as the glass fiber mats used in lead acid batteries. Further, the metal impurity inhibiting additives can be incorporated into the porous polymeric separators, such as polyvinyl chloride and microporous polyethylene. Typical concentrations of the additives associated with the separator is less than about 10 wt % preferably less than about 5 wt % basis the weight of the separators. The preferred metal impurity inhibiting additives are the microporous organic polymers, which allow for the inhibiting effect of the additives while not detrimentally adversely effecting the flow of electrolyte from and/or through the separator to the positive and negative plates.

Separators used for valve regulated lead-acid batteries operating on the oxygen recombination principle, i.e., oxygen recombinant batteries typically include one or more layers of silica-based glass, preferably separators formed of a highly absorptive porous mat of acid wettable binder free microfine glass fibers. Typically, a mix of fibers may be employed whose individual fibers have an average diameter in the range of a bout 0.2 to about 10 microns, more preferably about 0.4 to 5.0 microns, with possible minor amounts of larger gauge fibers to facilitate production of the mat. The porosity is preferably high, more preferably in the range of about 80% to about 98% and still more preferably about 85% to about 95%, if in the compressed state in the cell (slightly higher in the uncompressed state). The separator preferably has a relatively high surface area, more preferably in the range about 0.1 to about 20 m2/g, which facilitates the absorption and retention of relatively large amounts of acid electrolyte volumetrically while, if desired, still having a substantial unfilled pore volume permeable to oxygen for transport directly through the separator for consumption at the negative electrode. The particularly preferred separator materials have a surface area as measured by the BET method of in the range about 0.2 to about 3.0 m2/g., especially about 1.0 to about 2.0 m2/g.

As set forth above metal impurities are particularly detrimental in valve regulated lead acid batteries operating on the oxygen recombination principal, i.e. recombinant batteries. A number of impurity metals can exert a deleterious effect on the performance of recombinant batteries by for example, effecting one of more of the performance requirements of the recombinant batteries such as by increasing oxygen, evolution at the positive electrode, increasing hydrogen evolution at the negative electrode, inhibiting oxygen recombination at the negative electrode and in increasing the amount of water lost by the battery. Typical examples of metals that are particularly deleterious in recombinant batteries are arsenic, antimony, cobalt, chromium, nickel and tellurium.

As set forth above, the micronized organic polymers containing functional groups for controlling metal ion deleterious effects are incorporated into the recombinant battery separator. The separators can be for example porous mats and/or felts having microfine fibers typically glass fibers, organic fibers and/or mixtures of the combination of fibers. The fiber mats have an unfilled pore volume, which allows oxygen to be transported directly though the separator for consumption at the negative electrode. State of the art separators can be manufactured binder free and/or with binder. Battery separators of this type can be manufactured on paper making machines or in combination with a conventional melt blowing apparatus to produce polymer filaments which are deposited on a moving conveyer to form a flat mat or felt.

A particularly preferred process for manufacturing the micronized metal inhibiting additive recombinant battery separator is using conventional paper making processes. In this process an aqueous slurry of micronized fibers of different diameters and lengths is formed under acidic conditions. The slurry after agitation is passed through a wire or fabric filter to produce a wet separator typically without binders. The wet felt is dried to the finished product. As set forth above it is preferred that the cationic polymer first be added to the fiber slurry followed by addition of the micronized metal inhibiting additive optionally with a macroporous additive. In a further preferred embodiment the macroporous additive and the micronized metal inhibiting additive can be first formed preferably in the presence of the cationic polymer and then added to the above fiber slurry. In a further embodiment the macroporous additive and cationic polymer can first be added to the fiber slurry followed by addition of the micronized metal inhibiting additive. On filtration of the slurry the additive is retained in the felt separator as a homogenous uniformly dispersed additive with a high particle count per unit separator volume.

In another aspect of this invention the micronized metal inhibiting additive can be associated with a silica filled polymeric separator. The manufacture of polymeric separators is conventional state of the art as set forth in U.S. Pat. No. 3,351,495. In a preferred process the micronized metal inhibiting additive is associated with the silica fill preferably prior to the drying of the silica filler. In a further preferred embodiment the cationic polymer is also present to enhance the association of the silica filler and micronized metal inhibiting additive. The combined silica filler micronized additive and optionally the cationic polymer after drying can be used in conventional extrusion processes for the manufacture of silica filled polymer separators. The silica fillers used in polymeric battery separators are well known in the art and include silicas manufactured by PPG Industries under the trade name HI-Sil silicas. A particularly preferred silica for use in battery separators particularly lead acid battery separators are precipitated silicas. Typically silicas are present in the polyolefin separators at a concentration, basis the total weight of the separator, of from about 35–75 wt %, typically from about 50 wt % to about 75 wt %. As set forth above the cationic polymer linking agent can be used to enhance the association of the silica filler and micronized metal inhibiting additive. As set forth above the silica filler typically will have an anionic charge which can associate with the cationic polymer. It is contemplated within the scope of this invention that the silica filler can be modified to have a cationic charge such as colloidal cationic charged silica which provides for an enhanced association between the silica filler and the micronized metal inhibiting additive. Optionally the macroporous additive can be combined with the silica and metal inhibiting additive to enhance overall diffusion of the electrolyte to the additive when used in the lead acid battery separator. As set forth above the macroporous additives particularly the elongated fresh water diatomite derived additives enhance electrolyte distribution within the separator particularly the pores of the separator. As is known by those with ordinary skill in the art, pores within a polyolefin separator can be non electrolyte accessible, i.e. closed pores. An improvement in electrolyte distribution within the separator particularly the pores of the separator can enhance overall properties of the separator, particularly electrical properties through a reduction in internal resistance. Typical weight ratios of micronized metal inhibiting additive to silica is from about 1 to about 60, more typically from about 1 to about 40. In the extrusion process and formation of the polymeric separator it is preferred that the silica, metal inhibiting additive and optionally the macroporous additive have hydrophilic character such as to reduce and/or minimize the interfacial bonding between the polymer and the silica, additive and macroporous additive surfaces. A particularly preferred embodiment of this invention is the association of the micronized metal inhibiting additive with the silica surfaces to provide for enhanced hydrophilic character. Further hydrophilic character for the silica can be improved by hydration of the silica surfaces such as to reduce and/or minimize the interfacial bonding and/or wetting of the silica surface by the polymer used in the extrusion process. Particularly preferred polymers are the polyolefins, particularly polyethylene and polyvinylchloride.

As set forth above, the macroporous additive substrate can be optimized for a particular battery element and the particular electrical and/or mechanical requirements associated with such element. For example, in applications in which the particles are combined with other materials, such as fibers, polymers and negative active material of a lead acid battery and depending on the requirements of the application, average particle size ranges of from about 3 microns to about 100 microns, or even less than about 5 microns, typically ranges of from about 3 microns to about 50 microns or from about 5 microns to about 25 microns are useful. The macroporous substrates, can be characterized by bulk density (gm/cc) which is the weight or mass per unit volume considered only for the particle itself, i.e., includes the internal pore volume, surface area (M2/gm), total pore volume (cc(hg)/gm), pore size distribution and percent apparent porosity. In general, it is preferred that the bulk density be from about 3% to about 60% more preferably from about 10% to about 40%, more preferably, from about 10% to about 25% of the true density of the substrate material. Bulk densities less—than about 5% are also useful. In addition, the macroporous substrate can have a wide range of surface area ($m^2$/gm) of from about 0.10 to about 700 preferably having a moderate to high surface area, preferably, from about 1 m$^2$/gm to about 300 m$^2$/gm, more preferably, from about 5 m$^2$/gm to about 50 m$^2$/gm.

The pore volume is preferably from about 0.4 cc/gm to about 3.5 cc/gm, or even up to about 5 cc/gm, more preferably from about 0.7 cc/gm to about 4.5 cc/gm more preferably from about 0.7 cc/gm to about 3.25 cc/gm. The pore size distribution can vary over a wide range and can have various distributions including multi-modal, for example, bi-modadistribution of pores including macro pores and micro pores. There ideally exists a relationship between pore diameter, surface area and pore volume, thus fixing any two variables generally determines the third. In general, the mean (50%) pore diameter for macro pores, i.e., generally classified as having a pore diameter greater than about 750 angstroms can vary from about 0.075 microns to about 15 microns, more preferably, from about 0.1 micron to about 10 microns. The average pore diameter can vary according to the average particle size distribution of the micronized metal inhibiting additive. In general it is preferred that the pore size distribution provide for a plurality of micronized metal inhibiting additive associated with the interior of the macroporous additive.

As set forth above, the macroporous substrate can be inorganic for example, an inorganic oxide carbon and carbide, i.e., silicon carbide, sulfonated carbon preferably an inorganic oxide. Typical examples of inorganic oxides which are useful as substrates include for example, substrates containing one or more alumino silicate, silica, alumina, zirconia, magnesia, boria, phosphate, titania, ceria, thoria and the like, as well as multi-oxide type substrates such as alumina phosphorous oxide, silica alumina, zeolite modified inorganic oxides, e.g., silica alumina, perovskites, spinels, aluminates, silicates, e.g., zirconium silicate, mixtures thereof and the like. A particularly unique porous substrate is diatomite, a sedimentary rock composed of skeletal remains of single cell aquatic plants called diatoms typically comprising a major amount of silica. Diatoms are unicellular plants of microscopic size. There are many varieties that live in both fresh water and salt water. The diatom extracts amorphous silica from the water building for itself what amounts to a strong shell with highly symmetrical perforations. Typically the cell walls exhibit lacework patterns of chambers and partitions, plates and apertures of great variety and complexity offering a wide selection of shapes. Since the total thickness of the cell wall is in the micron range, it results in an internal structure that is highly porous on a microscopic scale. Further, the actual solid portion of the substrate occupies only from about 10–30% of the apparent volume leaving a highly porous material for access to liquid. The mean pore size diameter can vary over a wide range and includes macroporosity of from about 0.075 microns to 10 microns with typical micron size ranges being from about 0.5 microns to about 5 microns. As set forth above, the diatomite is generally amorphous and can develop crystalline character during calcination treatment of the diatomite. For purposes of this invention, diatomite as produced or after subject to treatment such as calcination are included within the term diatomite.

The particularly preferred macroporous substrates for use in the battery elements of this invention are diatomites obtained from fresh water and which have fiber-like type geometry, more preferably after calcination. By the term fiber-like type geometry is meant that the length of the diatomite is greater than the diameter of the diatomite and in view appears to be generally cylindrical and/or fiber-like. It has been found that these fiber like fresh water diatomites provide what is believed to be enhanced electrolyte diffusion to the micronized metal inhibiting additive, and as set forth above within the separator itself, which provides for improved binding of the metal cation contaminant to the metal inhibiting additive and for distribution of the electrolyte.

The macroporous substrate for use in lead-acid batteries, because of availability, cost and performance considerations, generally comprises acid resistant minerals, and/or ceramics more preferably in the form of particles, for example, fibers, and/or flakes, and/or beads including size reduced powders and hydrated powders.

The components including solid substrates including organic polymers and the micronized metal inhibiting additive and cationic polymer linking agent for use in lead-acid batteries are acid resistant. That is, the components exhibit some resistance to corrosion, erosion, oxidation and/or other forms of deterioration and/or degradation at the conditions present, e.g., at or near the positive plate, negative plate or positive or negative side of bipolar plates or separator, in a lead-acid battery. Thus, the component should itself have an inherent degree of acid resistance. If the component is acid resistant, the physical integrity and electrical effectiveness of the whole present battery element, is better maintained with time relative to a substrate having reduced acid resistance. If a mineral or ceramic is used as the macroporous substrate particle, it is preferred that the substrate has an increased acid resistance relative to E-glass. Preferably, the acid resistant mineral or ceramic substrate is at least as resistant as is C-or T-glass to the conditions present in a lead-acid battery.

As set forth above, one of the preferred applications for use of the macroporous substrates is in lead acid batteries. Thus, the substrates can be added directly to the negative active material of a lead acid battery, i.e., the negative electrode to improve battery performance, particularly active material utilization efficiency. One particular, unique aspect of the macroporous substrates is that the substrate is able to provide an internal reservoir for holding sulfuric acid electrolyte required for carrying out the electro-chemical reactions in the battery. The internal reservoir also improves the proximity of the electrolyte to the micronized metal inhibiting additive for higher rate binding efficiency of the metal cations to the additive.

As set forth above, the physical properties of the macroporous substrates can vary widely. It is preferred that the substrate have sufficient macro porosity and percent apparent porosity to allow for the utilization of the electrolyte sulfuric acid contained in the pores during discharge of the battery and, in addition, that the bulk density be selected to reduce the overall weight of the battery while enhancing the overall performance of the battery. In general, the preferable percent apparent porosity can vary from about 40% to about 92%, more preferably, from about 70% to about 90%. The mean pore diameter, particularly mean macro pore diameter, can vary over a wide range with the utilization of electrolyte during the condition of the discharge of the battery being an important factor i.e., at high rate discharges, such as cold cranking, high macro porosity is preferred. Preferred mean macro pore diameter is from about 1 micron to about 15 microns, more preferably, from about 2 to about 12 microns or even from about 0.075 micron to about 10 micron and still more preferably from about 0.1 to about 5 microns.

Another particularly unique embodiment of the present invention is the use of the porous substrate itself as an additive in the negative active material to provide a reservoir of electrolyte sulfuric acid while providing a lightweight additive for incorporation into the negative active material. Such particles are porous and within the ranges as set forth above for the porous substrates particularly the preferred ranges. Such porous substrates can be further coated with additional components such as other surface components, which may improve recharge, discharge and/or overall life of the battery, such as conductive components which are stable at the conditions of the negative electrode such as carbon and conductive metals, which coated porous substrates are included within the scope of this invention and the term porous substrate. The porous substrate with or without an additional component provides unexpected improvement in the performance of the negative active material particularly under cold cranking conditions particularly multiple cold cranking under lower that ambient temperature conditions. As set forth above, the porous substrate can provide unexpected improvement in cold cranking typically 0 degrees F. or lower during a series of multiple cold cranking. In addition, the porous substrates in the negative active material can provide for improved active material surface area maintenance and active material morphology maintenance particularly at elevated temperatures such as from about 60–80 degrees C. or higher.

Typically, the porous substrates with or without additional components are incorporated into the negative active material typically at a concentration of up to about 5-wt %, typically up to about 3-wt % basis the active material.

As set forth above, it is preferred that the porous substrate particles have sufficient macroporosity and percent apparent porosity for the utilization of the electrolyte sulfuric acid contained in the pores during discharge of the active material. Further, as set forth above, the preferred mean macropore diameter is from about 0.075 microns to about 10 microns and still more preferably from about 0.1 to about 5 microns. Particularly preferred solid porous particles that exhibit sufficient macroporosity to allow for improved utilization of sulfuric acid electrolyte are silica containing inorganic oxides preferably diatomites particularly those as set forth above and organic based materials particularly polyolefins still more preferably polypropylene.

The particularly preferred macroporous particles for use in the battery separators of this invention are those within the macroporosity ranges set forth above and those derived from fresh water diatomites, preferably after calcination, having a fiber-like porous structure and organic based macroporous particles also having an elongated type geometry, i.e. the average length of the particle is greater than the average diameter of the base particle. It has been found that the macroporosity and the fiber-like and/or elongated geometry allows for rapid equilibration of the electrolyte in the separator and for reducing the adverse effects caused by stratification of the electrolyte for example in the recombinant separators in valve regulated lead acid batteries.

Further unique embodiment of the present invention is the use of a resilient organic porous substrate which resists detrimental permanent deformation, maintains sufficient porosity for the sulfuric acid in the pores, has resiliency to be deformed under the conditions of discharge particularly mechanical forces in the active material of the lead acid battery and has resiliency to approach or attain its original geometry upon recharge of the battery. In a lead acid battery, the densities of the active material change i.e. lead at a density of 11.34 gram/cc, lead peroxide at a density of 9.4 grams/cc, (negative and positive plate respectively) change during discharge of the battery to lead sulfate having a density of 6.2 grams/cc i.e. lead sulfate. Upon recharge, the lead sulfate is converted back to lead and lead peroxide in the negative and positive plates respectively. The resilient organic porous substrates have the ability to be deformed during discharge and approach or attain their original geometry during recharge of the battery. The changes in density and the ability of the porous substrate to be deformed allows for increased availability and a greater amount of sulfuric acid from the pores of the substrate as a function of time to participate in a number of repetitive discharge and charge cycles leading to increased utilization efficiency. Typical examples of resilient organic porous substrates are elastomeric or rubber-like porous substrates wherein the pores allow the sulfuric acid to participate in discharge and charge cycles. Further examples of such organic resilient porous substrates are organic polymers including for example organic polymers selected from the group consisting of polyolefins, polyvinyl polymers, -phenol formaldehyde polymers, polyesters, polyvinylesters, cellulose and mixtures thereof. The polymers are selected to be acid resistant and compatible with the active material at the conditions of the electrode in which they are in contact. Various resilient organic porous substrates particularly macroporous particles can be produced using suspension polymerization of a dispersed phase consisting of monomers, cross-linking agents, initiators i.e. catalysts and a co-solvent that functions to aid pore formation. The particle size, pore volume, pore size distribution and macroporosity can be varied within the ranges as set forth above. Such resilient organic porous substrates including particles as set forth above have geometries and are typically used within the ranges as set forth above for the coated porous substrates, particularly the preferred ranges and, as set forth above, as to their use in positive active and negative active material. Depending on the particular active material in which such resilient porous substrates are incorporated, such porous substrates can be further coated with additional components such as with other surface components, which may improve overall properties such as discharge, recharge and life of the active materials.

As set forth above, the porous substrates including resilient porous substrates can be incorporated into the negative active material. The various porous substrates provide a reservoir of electrolyte sulfuric acid in the active material. The reservoir of sulfuric acid in the porous substrates can be added to the porous substrate prior to the addition of the porous substrate to the negative active material or incorporated into the porous substrate from the sulfuric acid electrolyte present in the lead acid battery. Further, other liquids such as water can be substituted for sulfuric acid if a liquid is added to the porous substrate prior to the addition of the porous substrate to the active material. As is recognized by those of skill in the art, only liquids which do not have an adverse detrimental effect on the performance of the battery should be added to the porous substrate prior to addition to the active material.

Further, the porous substrate as set forth above can be an acid resistant organic material, including organic polymeric materials as set forth above. Preferred polymers are polyolefin polymers, polyvinyl polymers, phenolformaldehyde polymers, polyesters, polyvinylesters and mixtures thereof. Preferred polymers are polyolefins, preferably polypropylene, phenolformaldehyde polymers and polyvinylester, particularly modacrylic polymers.

EXAMPLE 1

A separator battery element is manufactured on a paper making machine which has a head box for depositing a furnish to produce a web on a paper making wire. The paper making wire rotates in a clockwise direction advancing the web from left to right. The furnish (aqueous slurry of micronized fibers) has a low solids content of about 2% in acidified water. As the furnish is deposited on the paper making wire to form the web the liquid in the furnish flows through the wire and virtually all of the micronized glass fibers in the furnish are deposited on the paper making wire. The web of glass fibers is passed through a drying station typically including huge cans which are heated to above 100° C. The web is dried and wound into rolls before or after being split to a size suitable for use as a battery separator.

A furnish is made comprising acidified water, pH 2.8, and solid micronized fibers mixture having 70% of a fiber having a fiber diameter of 0.75 microns and 30% of the glass fiber having an average fiber diameter of 3 microns. To the furnish slurry is added an aqueous water soluble cationic polyethylenimine identified as Polymen PR 971L at a concentration of 0.5 wt % basis the solids content in the furnish. The slurry is slowly agitated for a period of ten minutes. To the agitated furnish is added 0.5 wt % (basis the solids microfiber in the furnish) of a micronized porous organic polymer having an average particle size distribution of less than 3 microns prepared from polystyrene and cross linked with divinylbenzene having amino methylene phosphonic functional groups. The furnish is drained through the wire screen to produce a layered separator. The wet layered separator is dried.

The micronized polymer having phosphonic functional groups is associated with the interior of the glass mat web and high retention of the additive in the fiber mat is observed. The separator is assembled into a 12-volt VRLA battery. Trace amounts of iron and antimony are present in the leady oxide used to manufacture the positive and negative plates. The detrimental effects of iron and antimony on the negative plate are inhibited by the additive in the separator.

EXAMPLE 2

The separator element of Example 1 is modified by using Polymen SKA. The cationic polymer is observed to provide retention of the micronized metal inhibiting additive in the glass fiber mat/felt.

EXAMPLE 3

The separator element of Example 1 is modified by adding a macroporous additive to the furnish slurry of fibers prior to the addition of the cationic polymer linking aid. The macroporous polymer is a fresh water diatomite having an average particle size distribution of 15 microns and an average pore size distribution within the range of from 1 to 5 microns. The macroporous additive is added at a wt % (basis the weight of dry fiber) of 20%. The fiber mat/felt has excellent retention of the micronized metal inhibiting additive and it is observed that the additive is associated with both the fiber as well as the interior portion of the macroporous additive.

EXAMPLE 4

A macroporous amino phosphonic divinylbenzene cross-linked polystyrene additive is compounded with a number of different polymer materials used commercially for the manufacture of silica filled battery separators. The silica is contacted with an aqueous solution of a cationic polymeric linking aid followed by contacting with the micronized phosphonic additive having an average particle size less than 1 micron. The silica cationic polymer additive modified blend is processed in a conventional mixture extrusion apparatus using separately both polyethylene and polyvinylchloride. The additive silica cationic polymer blend is hydrophilic and is observed to be present in the channels and pores of the separators and accessible to electrolyte. The separators are evaluated in a 12-volt flooded battery with 6% antimony grids for positive plates and negative grids containing no antimony. Trace amounts of iron are also present in the lead. The detrimental effects of iron and antimony on the negative plate are inhibited by the micronized additive in the silica filled polymeric separators.

EXAMPLE 5

A negative active material is manufactured by combining an expander package, a powdered micronized metal inhibiting additive prepared from polystyrene and cross-linked with divinylbenzene having aminomethylene phosphonic functional groups and having an average particle size distribution of less than 3 microns and leady oxide to form a dry mixture. Water is added followed by sulfuric acid and a paste is formed. The paste is pasted on 6% antimony golf car grids and assembled into flooded golf car batteries. The negative grids contained no antimony. The detrimental effects of antimony on the negative plate are inhibited by the additive in the negative plate.

EXAMPLE 6

The negative active material of Example 5 is modified by using a macroporous additive having an average particle size distribution of 10 microns and an average pore diameter of 1 to 5 microns. The metal inhibiting additive has an average particle size of less than 1 micron. The macroporous additive and metal inhibiting additive are combined in the presence of an aqueous cationic polymer Polymen PR971L. The additive is then added to the expander package and dry leady oxide. The battery is evaluated under partial state of charge cycling conditions and it is found to reduce the amount of negative sulfation of the negative plate.

While this invention has been described with respect to various specific examples and embodiments, it is to be understood that the invention is not limited thereto and that it can be variously practiced within the scope of the following claims.

What is claimed is:

1. A silica filled porous polymeric separator useful as an electrolyte reservoir in a battery wherein the silica filled porous polymeric separator comprises an electrolyte distribution enhancing amount of a plurality of acid resistant three dimensional fiber like freshwater diatomite macroporous particles to improve the distribution of electrolyte to the pores contained in the separator during repetitive discharge and charge cycles of the battery provided that said freshwater diatomite macroporous particles are associated with said separator to allow said electrolyte to be accessible to the pores of the separator.

2. The separator of claim 1 wherein the freshwater diatomite macroporous particles have a mean pore diameter from about 0.075 to about 10 microns.

3. The separator of claim 2 wherein the silica is a precipitated silica.

4. The separator of claim 2 wherein the freshwater diatomite macroporous particles have a mean pore diameter from about 0.1 to about 5 microns.

5. The separator of claim 1 wherein the silica is a precipitated silica.

6. A silica filled porous polyolefin separator useful as an electrolyte reservoir in a lead acid battery wherein the silica filled porous polyolefin separator comprises an electrolyte distribution enhancing amount of a plurality of acid resistant three dimensional fiber like freshwater diatomite macroporous particles to improve the distribution of electrolyte to the pores contained in the separator during repetitive discharge and charge cycles of the battery provided that said freshwater diatomite macroporous particles are associated with said separator to allow said electrolyte to be accessible to the pores of the separator.

7. The separator of claim 6 wherein the freshwater diatomite macroporous particles have a mean pore diameter from about 0.075 to about 10 microns.

8. The separator of claim 7 wherein the silica is a precipitated silica.

9. The separator of claim 7 wherein the freshwater diatomite macroporous particles have a mean pore diameter from about 0.1 to about 5 microns.

10. The separator of claim 6 wherein the silica is a precipitated silica.

11. A silica filled porous polyethylene separator useful as an electrolyte reservoir in a lead acid battery wherein the silica filled porous polyethylene separator comprises an electrolyte distribution enhancing amount of a plurality of acid resistant three dimensional fiber like freshwater diatomite macroporous particles to improve the distribution of electrolyte to the pores contained in the separator during repetitive discharge and charge cycles of the battery provided that said freshwater diatomite macroporous particles are associated with said separator to allow said electrolyte to be accessible to the pores of the separator.

12. The separator of claim 11 wherein the freshwater diatomite macroporous particles have a mean pore diameter from about 0.075 to about 10 microns.

13. The separator of claim 12 wherein the silica is a precipitated silica.

14. The separator of claim 13 wherein the macroporous particles have an average particle size less than 25 microns.

15. The separator of claim 12 wherein the freshwater diatomite macroporous particles have a mean pore diameter from about 0.1 to about 5 microns.

16. The separator of claim 11 wherein the silica is a precipitated silica.

17. The separator of claim 11 wherein the macroporous particles have an average particle size less than 25 microns.

* * * * *